United States Patent
Chiang et al.

[11] Patent Number: 5,623,400
[45] Date of Patent: Apr. 22, 1997

[54] CONTROL SYSTEM FOR SMOKE EXHAUSTER

[76] Inventors: Chao-Cheng Chiang; Chi-Shyong Chiang, both of P.O. Box 63-151, Taichung, Taiwan

[21] Appl. No.: 431,135

[22] Filed: Apr. 28, 1995

[51] Int. Cl.$^6$ .................................................. G05B 11/01
[52] U.S. Cl. ........................... 364/140; 364/143; 318/66; 454/906
[58] Field of Search ................................. 364/148, 160, 364/180, 184, 187, 140, 142, 143; 318/3, 11, 270, 60, 61, 779, 783, 249, 66, 67, 268, 772, 778; 454/49, 56, 75.206, 228, 238, 906

[56] References Cited

U.S. PATENT DOCUMENTS

| | | | |
|---|---|---|---|
| 4,458,185 | 7/1984 | Matty et al. | 318/270 |
| 4,992,709 | 2/1991 | Griffin | 318/249 |
| 5,174,248 | 12/1992 | Couetoux | 123/41.12 |
| 5,466,995 | 11/1995 | Genga | 318/3 |

*Primary Examiner*—Paul P. Gordon
*Assistant Examiner*—Thomas E. Brown

[57] ABSTRACT

A smoke exhauster includes a CPU, two motors and a switching circuit connected to the CPU. The switching circuit includes a common contact, a parallel contact for connecting the motors in parallel, and a series contact for connecting the motors in series. The common contact is connected to the parallel contact for allow higher power supply to start the motors, and the common contact is connected to the series contact for reducing power supply to the motors in order to reduce the rotational speed of the motors. The motors are connected in series after the motors are started.

1 Claim, 2 Drawing Sheets

CONTROL SYSTEM FOR SMOKE EXHAUSTER

BACKGROUND OF THE INVENTION

1. Field of the Invention

The present invention relates to a smoke exhauster, and more particularly to a control system for the smoke exhauster.

2. Description of the Prior Art

Typical smoke exhausters comprise two motors for driving fan blades in order to vacuum smokes. Normally, the rotational speeds of the motors may be adjusted for use in different conditions. However, typical smoke exhausters comprise a number of resistors arranged in series, comprise a number of contacts arranged between the resistors and comprise a control device movable between the contacts in order to adjust the number of resistors or to adjust the resistance so as to adjust the rotational speed of the fan blades. However, the resistors may generate heat and may be heated to a temperature up to 270° C. One typical control system for the smoke exhauster is disclosed in Taiwanese Patent Application Serial No. 82214993, filed Oct. 15, 1993, and published on Feb. 11, 1994. Fire may occur when gas leaking and when gas is ignited by the high temperature of the resistors.

The present invention has arisen to mitigate and/or obviate the afore-described disadvantages of the conventional smoke exhausters.

SUMMARY OF THE INVENTION

The primary objective of the present invention is to provide a control system for a smoke exhauster in which no resistors are required for adjusting the rotational speed of the motor such that no heat will be generated.

In accordance with one aspect of the invention, there is provided a control system for a smoke exhauster comprising a central processing unit, a power supply circuit for supply electric power to the control system, two motors coupled to the central processing unit, and a switching circuit connected to the central processing unit and including a common contact, a first contact and a second contact, the common contact being connected to the first contact for connecting the motors in parallel and the common contact being connected to the second contact for connecting the motors in series. The common contact is connected to the first contact for connecting the motors in parallel so as to allow higher power supply to the motors, and the common contact is connected to the second contact for connecting the motors in series so as to reduce power supply to the motors in order to reduce the rotational speed of the motors. The central processing unit connects the common contact to the second contact after the motors are started.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
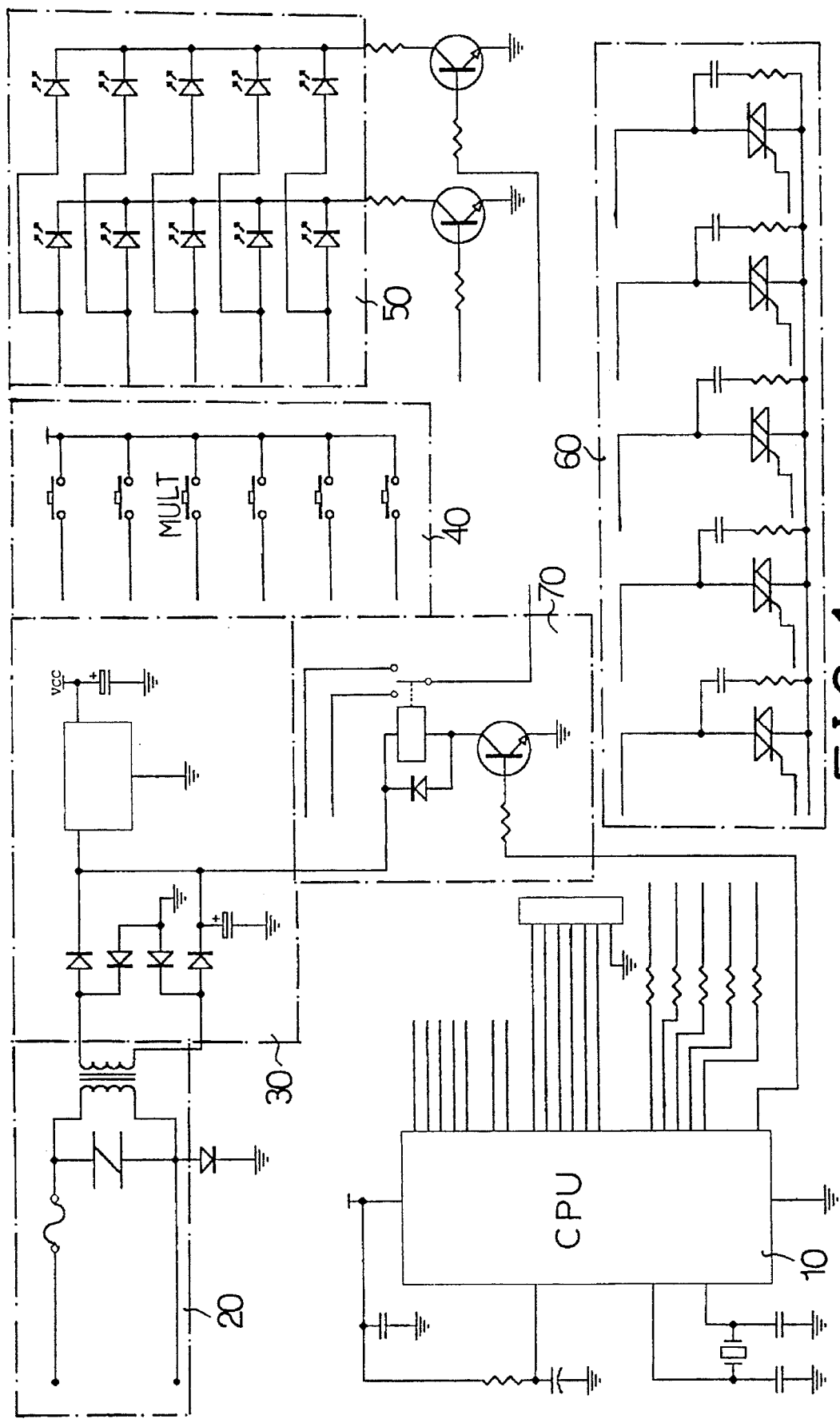
FIG. 1 is an electric diagram of a control system for a smoke exhauster in accordance with the present invention.

Referring to the drawings, and initially to FIG. 1, a control system for a smoke exhauster in accordance with the present invention comprises a microprocessor or a central processing unit (abbreviated as CPU hereinafter). A power supply circuit 20 is coupled to an electric power supply for supplying power supply to the control system, the power supply circuit 20 may includes a converter for converting AC current to DC current. A stabilizing circuit 30 is provided for stabilizing the electric power supplied to the control system. A number of switches or buttons 40 are provided for controlling the control system, in which a button MULT is provided for control and for switching the lower rotational speed of the motors. A number of indicating lights 50 are provided for indicating the control modes of the smoke exhauster. A number of protective circuits 60, such as triacs, are provided for filtering the signals and provided for preventing the electric circuit from generating sparks. A switching circuit 70 is coupled to the CPU and is provided for changing the rotational speeds of the motors and for reducing the power supply to the motors.

Figure 2:
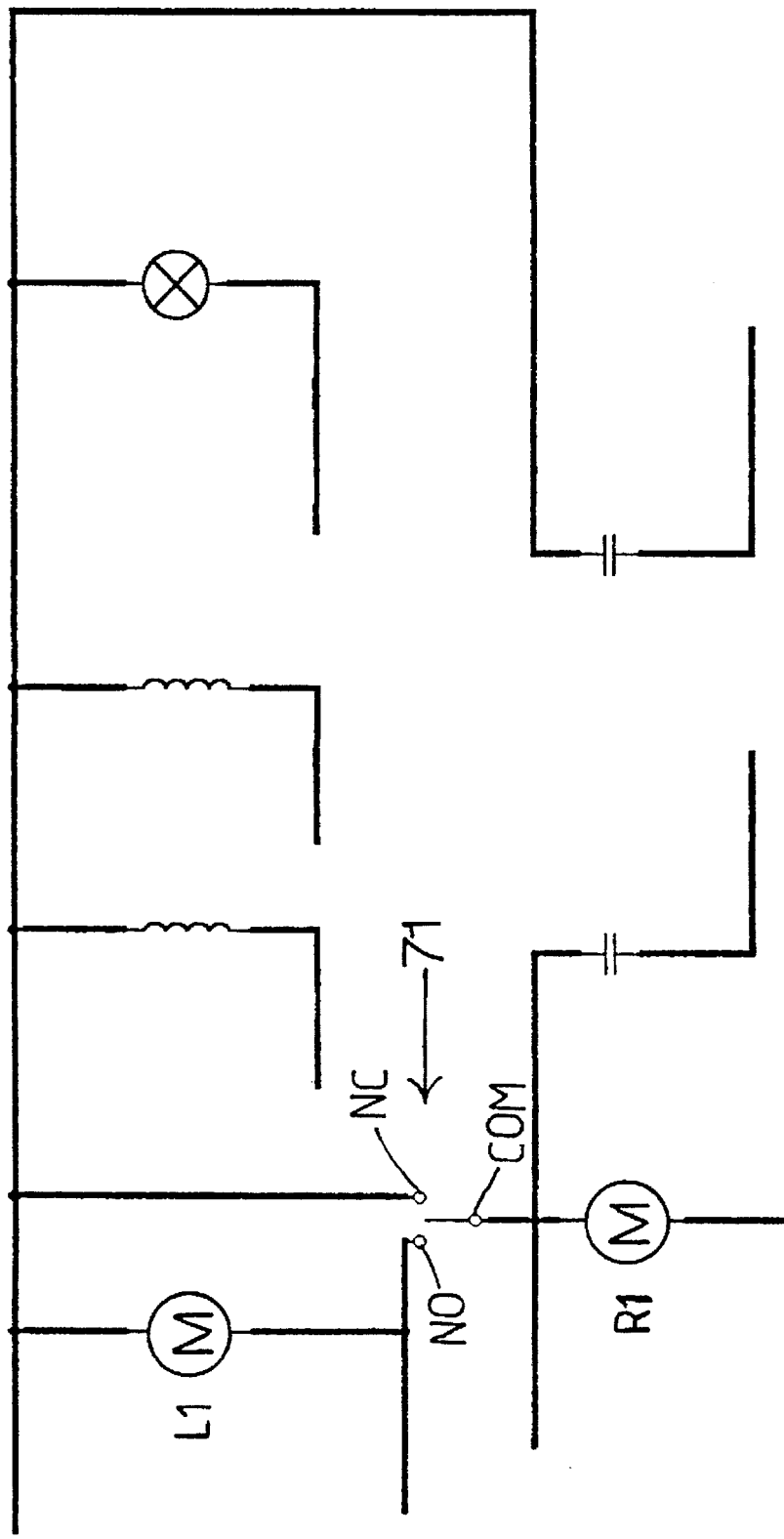
FIG. 2 is a detailed electric diagram showing a portion of the control system for the smoke exhauster.

As shown in FIG. 2, L1 and R1 represent two motors of the smoke exhauster. The switching circuit 70 includes a relay switch means 71 which includes a common contact COM, a contact NC for coupling the motors L1 and R1 in parallel, and another contact NO for coupling the motors L1 and R1 in series. When the relay switch means 71 is connected to the contact NC for coupling the motors L1 and R1 in parallel, the power supplied to the motors L1 and R1 is in normal condition and has a higher power supply to the motors L1, R1. However, when the relay switch means 71 is connected to the other contact NO for coupling the motors L1 and R1 in series, the power supplied to the motors L1 and R1 is reduced to one quarter of the original power supply such that the rotational speed of the motors L1, R1 are greatly reduced and such that the noise generated by the motors can be greatly reduced. Accordingly, the switching circuit 70 may be called as silence circuit.

In operation, when the button MULT is operated, the CPU may connect the relay switch means 71 to the contact NC for coupling the motors L1 and R1 in parallel. At this moment, the power supplied to the motors L1 and R1 has a higher power supply such that the motors L1, R1 may be easily started. When the motors are started or after the relay switch means 71 is connected to the contact NC for about 3 seconds, the relay switch means 71 is connected to the other contact NO for coupling the motors L1 and RI in series, the power supplied to the motors L1 and R1 is reduced to one quarter of the original power supply such that the rotational speed of the motors L1, R1 are greatly reduced and such that the noise generated by the motors can be greatly reduced.

Accordingly, the control system includes a relay switch means that may connect the motors in parallel in order to start the motors and that may connect the motors in parallel after started such that the rotational speed of the motors L1, R1 can be greatly reduced and such that the noise generated by the motors can be greatly reduced.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A smoke exhauster having a control system, said smoke exhauster comprising:

a central processing unit, a power supply circuit for supply electric power to said control system, two motors coupled to said central processing unit, and a switching circuit connected to said central processing unit and including a common contact, a first contact and a second contact, said common contact being connected to said first contact for connecting said motors in parallel and said common contact being connected to said second contact for connecting said motors in series, said common contact being connected to said first contact for connecting said motors in parallel for supplying greater power supply to said motors and for starting said motors, and said common contact being connected to said second contact for connecting said motors in series and for reducing power supply to said motors and for reducing the rotational speed of the motors and for reducing a noise, said central processing unit connecting said common contact to said second contact after said motors are started.

* * * * *